(No Model.)
W. GLOVER.
REST FOR COTTON BALES.
No. 263,695.  Patented Sept. 5, 1882.
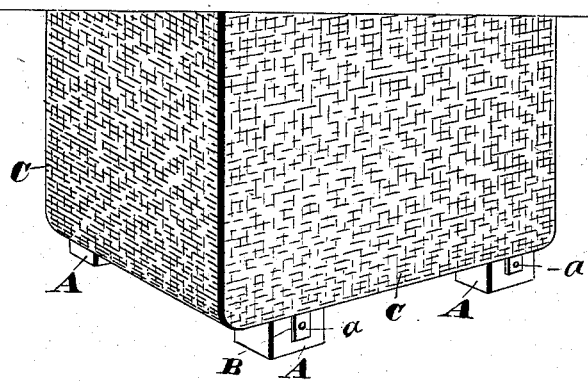
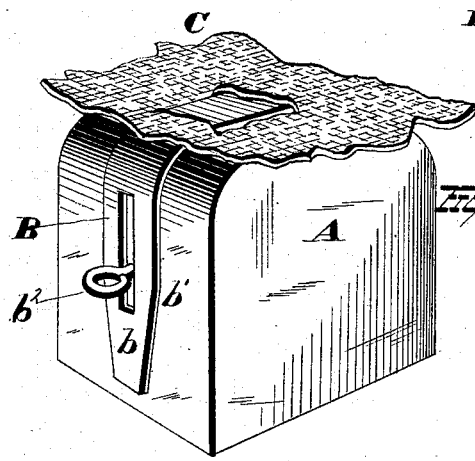
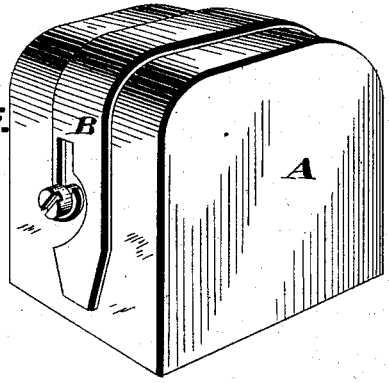
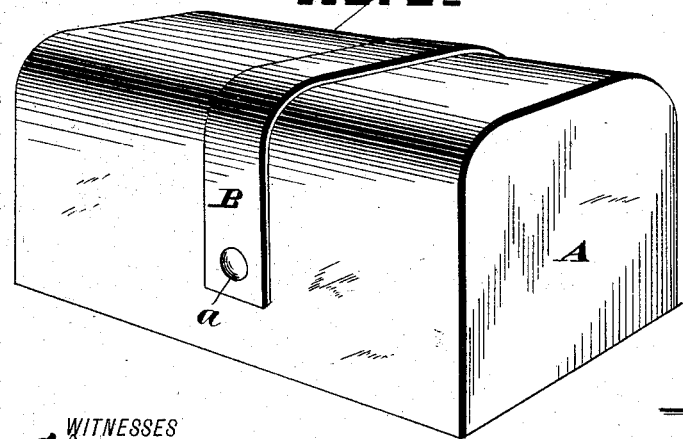
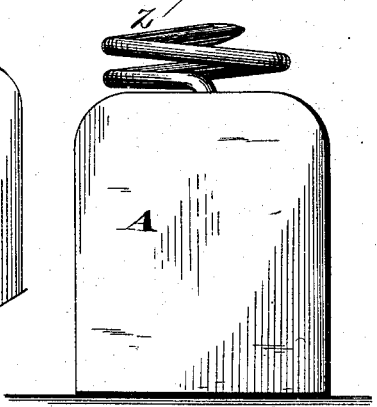
WITNESSES
INVENTOR
Wilson Glover
By H. A. Seymour
Attorney

UNITED STATES PATENT OFFICE.

WILSON GLOVER, OF CHARLESTON, SOUTH CAROLINA, ASSIGNOR OF ONE-HALF TO J. L. ROXBURGH, OF SAME PLACE.

REST FOR COTTON-BALES.

SPECIFICATION forming part of Letters Patent No. 263,695, dated September 5, 1882.

Application filed August 2, 1882. (No model.)

*To all whom it may concern:*

Be it known that I, WILSON GLOVER, of Charleston, in the county of Charleston and State of South Carolina, have invented certain new and useful Improvements in Rests for Cotton-Bales; and I do hereby declare the following to be a full, clear, and exact description of the invention, such as will enable others skilled in the art to which it pertains to make and use the same.

My invention relates to rests for bales of cotton.

It is well known that a large amount of cotton is damaged after baling by the contact of the bale with damp floors or muddy ground. It frequently happens that the bales are delivered at a wharf or warehouse during a shower of rain, and are stood up on their ends and allowed to remain for a while, and in such instances the bale will be found to be damaged at the end upon which it rested.

The object of my invention is to obviate the difficulty above noted by providing a bale with removable and portable rests adapted to be readily secured to the bale, so that the latter will be supported above the ground or floor, and thus protected.

The invention consists in the combination, with a bale, of rests or supports adapted to be removably secured thereto, as fully described hereinafter.

The invention further consists in the combination, with a bale, of rests or supports provided with devices for securing the same to the bale.

The invention further consists in the combination, with a bale, of rests or supports provided with devices for engaging the bagging of the bale, as hereinafter set forth.

The invention further consists in the combination, with a bale, of a rest or support provided with a metallic band secured at one end to one side of the rest, and adapted to pass through a portion of the bale and be detachably secured at its opposite end to the adjacent side of the rest.

The invention further consists in a portable rest or support for cotton-bales, adapted to be removably secured to the bale.

In the drawings, Figure 1 represents a bale of cotton provided with my improvement. Fig. 2 represents a detached view of one of my improved rests secured to a portion of the bagging of the bale. Fig. 3 is a similar view of a modification. Figs. 4 and 5 are modifications.

A represents a block of wood, metal, paper, or any other suitable material, preferably rounded at its upper end to receive a band, B, preferably of spring metal, which is secured at one side of the block by a screw $a$, or in any other desired manner. This band B is adapted to pass through a portion of the bagging C of the bale, as shown in Figs. 2 and 3, and secured at its opposite end to the adjacent side of the block A in any desired manner.

I have shown in Fig. 1 my preferred construction of the band B, in which the free end $b$ of the latter is provided with a longitudinal slot, $b'$, adapted to take over a button or screw-eye, $b^2$, secured to the adjacent side of the block A. I do not, however, limit myself to any particular form of devices for securing the end of the band to the block. Modifications of the fastenings are shown in Figs. 3 and 4. Neither do I limit myself to the use of the band B as a retaining device for the block, as it will be apparent that many other equally suitable devices may be employed to secure the blocks in position. For instance, as shown in Fig. 5, I may use a spiral screw, Z, driven into the upper side of the block, and adapted to be screwed into the bagging of the bale. Ordinarily four blocks are used with each bale, as shown in Fig. 1; but I do not restrict myself to the number shown, as more or less than four may be employed, and, as shown in Fig. 4, instead of forming the blocks of the nearly-square form shown, the same may be made longer, so that only two will be required, one on each side of the end of the bale.

It is obvious that my invention admits of many alterations and modifications without departing from its scope and spirit. Hence I would have it understood that I do not limit myself to the specific devices herein shown and described, but reserve to myself the right to make all such changes as the nature of my invention warrants.

Having fully described my invention, what I claim as new, and desire to secure by Letters Patent, is—

1. As a new article of manufacture, a rest or support for bales provided with devices for securing it to the bale, substantially as set forth.

2. As a new article of manufacture, a block or rest for bales, provided with a grasping and clamping device, substantially as set forth.

3. The combination, with a bale, of rests or supports provided with devices for removably securing the same to the bale, substantially as set forth.

4. The combination, with a bale, of rests or supports provided with devices for engaging the bagging of the bale, substantially as set forth.

5. The combination, with a bale, of a block or support provided with a band secured at one end to one side of the block and adapted to pass through a portion of the bagging of the bale and be detachably secured at its opposite end to the adjacent side of the block, substantially as set forth.

6. The combination, with the block and the band, the latter being adapted to engage a portion of the bagging of the bale, of devices for detachably securing the free end of the band, substantially as set forth.

7. The combination, with the block, of a band of spring metal secured at one end to one side of the block and adapted to pass through a portion of the bagging of the bale, while its free end is slotted and adapted to engage a stud or other retaining device on the adjacent side of the block, substantially as set forth.

8. The combination, with a block or support, of a spiral screw adapted to be screwed into the bagging of a bale, substantially as set forth.

In testimony whereof I have signed this specification in the presence of two subscribing witnesses.

WILSON GLOVER.

Witnesses:
E. A. BALAGNER,
F. C. BLACK.